June 2, 1964 B. R. GOOCH 3,135,476

HIGH-RESOLUTION TAPE-TRANSPORT SYSTEM FOR MAGNETIC RECORDERS

Filed April 26, 1957

INVENTOR:
Beverley R. Gooch
BY
Ralph F. Staubly
ATTORNEY

United States Patent Office 3,135,476

Patented June 2, 1964

3,135,476
HIGH-RESOLUTION TAPE-TRANSPORT SYSTEM FOR MAGNETIC RECORDERS

Beverley R. Gooch, 2121 Blair Blvd., Nashville, Tenn.

Filed Apr. 26, 1957, Ser. No. 663,564
4 Claims. (Cl. 242—55.12)

This invention relates to a high-resolution magnetic-tape transport system.

More particularly the invention pertains to a high- resolution magnetic-tape transport system in which the inevitable wow and flutter are minimized by the use of a combination of (1) tape-tension-responsive controls for maintaining constant speed and tension in the tape, and (2) an electrically synchronized and mechanically filtered drive for the capstan, and (3) a sinuous tape-guiding system consisting of massive guide spools for further mechanical filtering out of the wow and flutter.

It is the object of this invention to provide a high-resolution magnetic-tape transport system embodying the above-enumerated features. Other objects and advantages of the invention will become apparent as the following detailed description proceeds.

Figure 1:
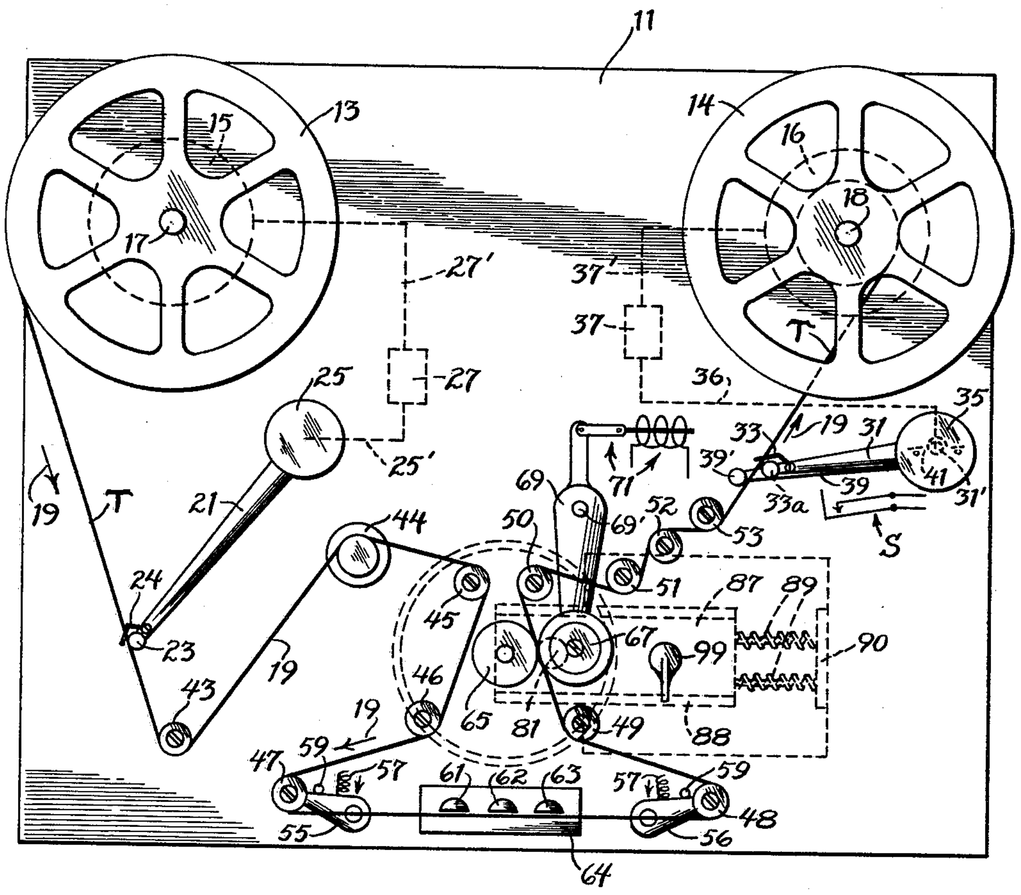
FIG. 1 is a plan view of a preferred embodiment of the invention.

With reference now to the drawings, the numeral 11 designates the horizontally disposed panel upon which the apparatus is mounted. Panel 11 has mounted thereon toward its far corners the supply reel 13 and a similar take-up reel 14 for the magnetic tape T (of conventional construction and of any desired width, a quarter inch having been found satisfactory). The reels 13 and 14 are coupled to a pair of A.C. torque motors 15 and 16 mounted on the reel shafts 17 and 18 and beneath the supporting panel 11. Motors 15 and 16 supply the torque to the reels 13 and 14 for winding the tape T forwardly or reversely from or onto said reels, in known manner and for known purposes. The motors 15 and 16 are employed, moreover, depending upon the direction of tape movement, for recording, playback, or rewinding, to provide a desirable drag or tensioning pull upon the tape of the order of several ounces.

The tape T moves in the direction of the arrows 19 during recording and playback, at a speed of the order of 150 inches per second for black-and-white video information, or at a correspondingly higher speed for color-television recording. The tape-tensioning reverse pull on the tape T exerted by motor 15 during recording or playback, is kept relatively constant by the feeler arm 21, the position of which alters as the variation of the line of tangency of tape T held on the reel 13 varies with decreases in diameter during recording or playback. The arm 21 has a tape-contacting smooth-surfaced post 23 at its feeler end and also has a detachable wire guide loop 24 for preventing disengagement of the end of the arm 21 from the tape T. The hub portion 25 of the arm 21 is connected by conventional mechanical means (not shown) to the schematically shown servo-control 27.

Servo-control 27 may be of any conventional construction, such as a variable autotransformer coupled to the motor 15 so as to maintain a substantially constant drag or reverse pull from the tape T, in well-known manner. While it is apparent that a tension-responsive control for the reverse pull would be probably more accurate than a tangency-responsive feeler, it has been found that the tension-responsive control is less satisfactory due to its tendency to apply excessive tension at the starting of the apparatus, which could sometimes result in a breaking of the tape.

However, it has been found both practical and desirable to use a tension-responsive control for maintaining constant tape tension at the wind-up reel 14. This tape-tension mechanism comprises the arm 31 and an adjustable and removable tape-engaging feeler loop 33 fastened to the free end thereof. The hub 35 of the feeler arm 31 is mechanically connected by conventional mechanism (schematically designated 36) to the servo-control device 37, which like the control device 27 can be an autotransformer, a photoelectric device, potentiometer, etc. Servo-control device 37 is electrically connected by leads 37' to the motor 16 in known manner for maintaining a substantially constant pull of the order of several ounces upon the tape T. The shaft 31' mounting the arm 31 also carries a second arm 39 having a tape-engaging feeler post 39' mounted on its outer end and bearing very lightly forwardly against the tape T. The arm 39 has the function of swinging forwardly so as to open the safety control switch S in the event of breakage of the tape. The arm 39 is swung toward circuit-opening position by a spring 41.

Between the constant-tension-maintaining feeler arms 21 and 31 the tape T passes sinuously over the relatively massive guide rollers 43—53, all of which are desirably made of chromium-plated brass or equivalent material and are mounted on very accurate ball bearings tightened to eliminate end play as well as wobble. The rollers 43—53 are preferably formed as spools the upper and lower flanges of which engage the tape edges to prevent vertical tracking. Roller 44 (and others, if desired) can be made more massive to increase the mechanical damping (and thereby further decrease the "flutter" speed variations in the tape). The spools 47 and 48 are mounted on slack-takeup arms 55 and 56, spring-biased forwardly by springs 57 away from their disclosed tape-tension held rearward positions against stop pins 59.

The recording heads 61—63, which can be video, audio, and monitoring heads in desired numbers and kinds are mounted on a support structure 64 of conventional construction.

The tape T is stretched between rollers 49 and 50 so as to slightly clear the periphery of the tape-driving capstan cylinder 65 (later to be described) to prevent wear of the tape during idling, but is pressed into driven contact with the capstan 65 by the resilient-surfaced idler roller 67 mounted on the arm 69. Arm 69 is automatically swung to the tape-driving position disclosed by the schematically shown solenoid 71, when the apparatus control switch (not shown) is turned "on."

Figure 2:
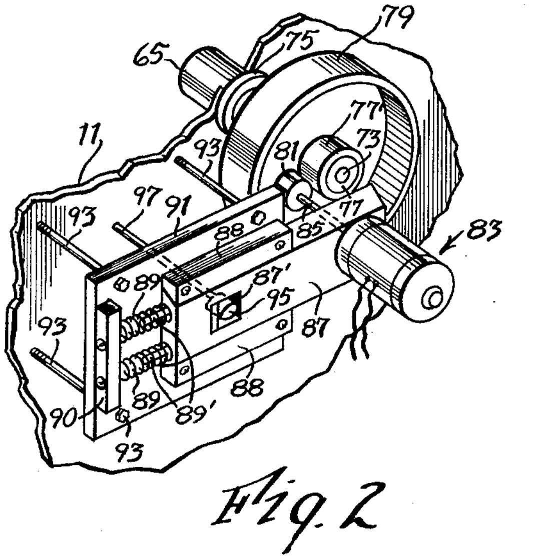
FIG. 2 is a fragmentary perspective view from below of the capstan-driving mechanism.

The driving mechanism for capstan 65 is best shown in FIG. 2. Capstan 65 is mounted on a shaft 73 journaled in bearing 75 carried by the panel 11. Shaft 73 has fixed to its near end (FIG. 2) or lower end (FIG. 1) the hub 77 of the flywheel 79. The hub 77 is preferably covered by a cylindrical band 77' of somewhat resilient material for engagement by the wheel 81 driven by the synchronous motor 83 to which it is coupled by the shaft 85. Motor 83 is mounted on the slide plate 87 which is guidedly mounted between the tapered guides 88. A pair of compression coil springs 89 held in place by pins 89' and abutting against bar 90 yieldably urge slide plate 87 in the direction producing driving engagement between wheel 81 and hub band 77'. A mounting plate 91 dependingly supported from panel 11 by the threaded posts 93 supports the capstan-driving assemblage 81—90. Slide plate 87 is manually movable against the force of springs 89 to disengage drive wheel 81 from band 77' by the cam 95 located in aperture 87' and rotatable by the shaft 97 and the knob 99 (FIG. 1).

While I have shown a certain preferred embodiment of my invention, it is to be understood that many changes can be made in the size, shape, composition and arrangement of the parts without departing from the spirit of the invention as defined by the subjoined claims.

Having thus described my invention, I claim:

1. A high-resolution recording-tape transport apparatus, comprising: a pair of winding and unwinding devices for holding said tape, reversible motive means for driving said devices, tape-condition-responsive means for varying the torques applied by said motive means to said devices to maintain a substantially constant tension in said tape, a capstan for driving said tape through a head zone adapted to receive one or more recording and playback heads, a substantially constant-speed motive means for driving said capstan, motor vibration filtering means mechanically interconnecting said capstan and said constant speed motive means and comprising a high-inertia fly-wheel-like means and a resilient coupling means, massive guide rollers disposed to guide said tape through a sinuous path therearound for mechanically filtering out signal-distorting tape-speed-varying tension fluctuations in said tape especially in the head zone, motor vibration filtering means mechanically interconnecting said capstan and said motive means and comprising high-inertia fly-wheel-like means and a resilient coupling means, at least one tape-guide-mounting yieldable arm for minimizing tape breakage during starting or stopping of said apparatus.

2. Apparatus according to claim 1, said tape-condition-responsive means comprising at least one feeler responsive to tension in said tape.

3. Apparatus according to claim 1, said tape-condition-responsive means comprising at least one feeler responsive to variations in tape position due to changes in diameter of the wound-up tape portions.

4. Apparatus according to claim 1 wherein said tape-condition-responsive means includes a feeler responsive to tension in the said tape being wound on said winding device and another feeler responsive to variations in tape position due to changes in diameter of the tape on said unwinding device.

References Cited in the file of this patent

UNITED STATES PATENTS

| | | |
|---|---|---|
| 1,857,817 | McCann | May 10, 1932 |
| 2,259,241 | Cook | Oct. 14, 1941 |
| 2,544,467 | Michel | Mar. 6, 1951 |
| 2,622,813 | Lindsay | Dec. 23, 1952 |
| 2,743,922 | Hoehn | May 1, 1956 |
| 2,745,604 | Masterson | May 15, 1956 |
| 2,927,743 | Shatavsky | Mar. 8, 1960 |